Dec. 23, 1952    H. KLAUE    2,622,703
BRAKE FOR THE HUBS OF BICYCLES, MOTORCYCLES OR THE LIKE
Filed Sept. 26, 1949

INVENTOR.
HERMANN KLAUE
BY *[signature]*

ATTORNEY

Patented Dec. 23, 1952

2,622,703

UNITED STATES PATENT OFFICE 2,622,703

BRAKE FOR THE HUBS OF BICYCLES, MOTORCYCLES, OR THE LIKE

Hermann Klaue, Überlingen, Bodensee, Germany

Application September 26, 1949, Serial No. 117,890
In Germany October 1, 1948

1 Claim. (Cl. 188—26)

The present invention relates to bicycles, motorcycles or the like, and more particularly to a brake for a bicycle, motorcycle or the like.

An object of the present invention is to provide a brake for a bicycle, motorcycle or the like which is of simple and compact construction.

Another object of the present invention is to provide a brake for a bicycle, motorcycle or the like, which may be manipulated with little effort.

A further object of the present invention is to provide a brake for a bicycle, motorcycle or the like, which may be readily manufactured at low costs.

Another object of the present invention is to improve on the construction of hubs for bicycles, motorcycles or the like as now ordinarily made.

Figure 1:
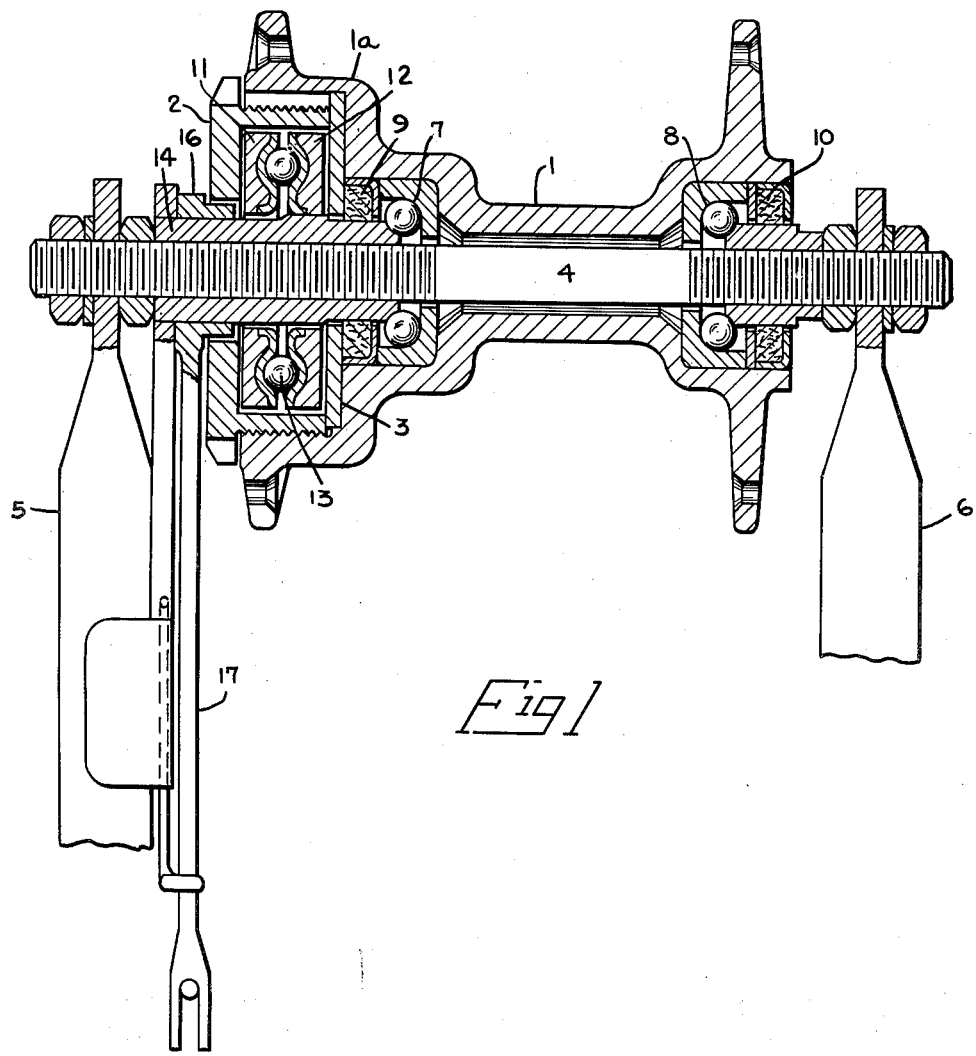
Figure 2:
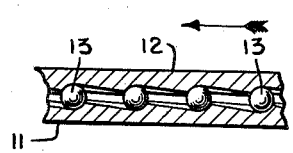

Other objects and structural details of the invention will be apparent from the following description when read in conjunction with the accompanying drawings, wherein:

Fig. 1 is a sectional view of the hub of a bicycle including a brake according to the invention, and Fig. 2 is a section taken along the line of balls between the brake discs.

Referring now to the drawings, 1 generally indicates the body of the hub of a bicycle or the like. Said body 1 of the hub is rotatably arranged on the stationary axle 4 by means of ball bearings 7 and 8 sealed by packing glands 9 and 10 respectively. The axle 4 is immovably connected with the fork tubes 5 and 6 in a customary manner. A member 14 being provided with a conical end portion engaged with the balls of the ball bearing 7 and being arranged on the stationary axle 4 projects from the left hand end portion of the body 1 (as viewed in Fig. 1). Said member 14 is prevented from rotation relative to the fork 5 and the axle 4 immovably secured to the latter. Said left hand end portion of the body 1 is widened so as to form a housing 1a capable of receiving the elements of a brake. A steel disc 3 provided with a center bore and inserted into said housing is pressed against the wall of the body 1 by means of a brake cover 2 likewise provided with a center bore and screwed into a threaded bore of said housing. Thus said cover 2 and said disc 3 participate in rotations of the body 1 of the hub.

The brake comprises two brake discs 11 and 12 arranged on said bearing member 14 between the closing portion of the cover 2 and the disc 3. Preferably, the portions of said brake discs having the braking surfaces are made of pressed braking material. Each of said brake discs is provided with a series of recesses uniformly distributed along the circumference. The recesses are arranged at sides of the brake discs facing each other. A series of balls 13 engaged with said recesses are arranged between said brake discs. According to Fig. 2 the bottom surfaces of the recesses of the brake disc 12 are inclined towards the adjacent brake disc 11 in the direction of the forward rotation of the hub indicated by an arrow in said Fig. 2 and the bottom surfaces of the recesses of the brake disc 11 are inclined towards the adjacent brake disc 12 opposite to said direction of the forward rotation of the hub. The inclined bottom surfaces of the recesses of said brake discs 11 and 12 are parallel to each other.

The brake disc 12 is in splined engagement with the bearing member 14 by the wedge 21, so that the brake disc 12 may be axially displaced on the member 14 but is prevented from a rotation relative to said member 14. An abutting lever 15 rigidly connected with the protruding end of said member 14 is provided with a lug capable of abutting engagement with the fork 5 so as to transmit the moment of the braking couple onto said fork 5 when the braking disc 12 is in braking engagement with the disc 3.

Abutting level 15 is provided within its center bore with projections 18, fitting into corresponding recesses provided on bearing member 14 and assisting in transmission of the moment. The width in axial direction of the recesses in bearing member 14 is slightly less than the width of lever 15, an air gap remaining between bearing member 14 and the adjacent counter screw 20, thus increasing the thrust exerted by said screw on lever 15.

The brake disc 11 is rotatably and axially movably arranged on the bearing member 14. An actuating element or brake lever 17 is rigidly connected with an engaging dog 16 swingably mounted on the bearing member 14 and operatively engaged by claws 22 with the rotatable and axially movable brake disc 11. Thus, the brake disc 11 may be rotated by an actuation of the brake lever 17 through the medium of the engaging dog 16.

When during the use of the bicycle or the like the brake shall be rendered effective, the brake lever 17 is swung to a certain extent. This causes a rotation of the brake disc 11 in the direction of the forward rotation of the body 1 of the hub, i. e. in the direction of the arrow shown in Fig. 2. This rotation of the brake disc 11 in turn causes the balls 13 between the brake discs 11 and 12 to roll along the inclined bottom surfaces of the recesses in said brake discs, so that, owing to the particular arrangement of said bottom surfaces, the brake discs 11 and 12 are spread apart from each other for braking engagement with the cover 2 and the disc 3 respectively. The rotation of the brake disc 11 in the direction of the forward rotation of the body 1 of the hub is assisted by the servo-effect exerted on said brake disc 11 by the body 1 and the cover 2. As will be readily understood from above, the arrangement of the inclined bottom surfaces of the recesses of the brake discs 11 and 12 assures a high braking effect by means of a comparatively slight rotation of the braking disc 11 relative to the braking disc 12.

Although according to the embodiment shown in the drawings the braking action of the brake is obtained by a rotation of the rotatable braking disc 11 by means of the brake lever 17 in the direction of the forward rotation of the hub, the mechanism could also be designed in such a way, for example by means of a corresponding arrangement of the inclined bottom surfaces of the recesses of the brake discs, that the braking action is obtained by a rotation of the rotatable brake disc in a direction opposite to the forward rotation of the hub. However, then, the rotation of the brake disc 11 would require the application of a higher force, as there will be no assisting effect on the brake disc for a rotation thereof by means of the rotating walls of the hub coming into engagement with the braking means.

I have described preferred embodiments of my invention, but it is understood that this disclosure is for the purpose of illustration and that various omissions or changes in shape proportion and arrangement of parts, as well as the substitution of equivalent elements for those, herein shown and described, may be made without departing from the spirit and scope of the invention as set forth in the appended claim.

What I claim is:

In a hub structure for placement in the frame of a bicycle or motorcycle, an axle supported by said frame, said hub structure comprising a hollow hub body rotatable on said axle and having an extension at the one end of said hub body to form a housing, a first and a second brake disc in said housing and carried by said axle, a cover having a bore for the passage therethrough of said axle rigidly connected with said housing, a braking surface in said housing and in said cover, a series of recesses in the sides of said brake discs facing each other, the bottom surface of said recesses being inclined, a series of free-wheel balls coacting with said recesses to displace said brake discs axially for engagement with said braking surfaces, means associated with said axle and the first brake disc to prevent the latter from rotation, actuating means passing through the bore of said cover and being connected with said rotatable second brake disc for a mutual spreading of said discs upon rotation of said second brake disc.

HERMANN KLAUE.

REFERENCES CITED

The following references are of record in the file of this patent:

UNITED STATES PATENTS

| Number | Name | Date |
|---|---|---|
| 723,352 | Abell | Mar. 24, 1903 |
| 1,197,113 | Ellett | Sept. 5, 1916 |
| 1,696,879 | Chase | Dec. 25, 1928 |
| 2,014,348 | Woodward | Sept. 10, 1935 |
| 2,108,467 | Backstrom | Feb. 15, 1938 |
| 2,140,731 | Bendix | Dec. 20, 1938 |
| 2,344,933 | Lambert | Mar. 21, 1944 |
| 2,375,854 | Lambert | May 15, 1945 |

FOREIGN PATENTS

| Number | Country | Date |
|---|---|---|
| 251,130 | Great Britain | Apr. 29, 1926 |